Feb. 2, 1932. S. N. BUCHANAN 1,843,202
PIPE COUPLER
Filed Feb. 20, 1928 2 Sheets-Sheet 1
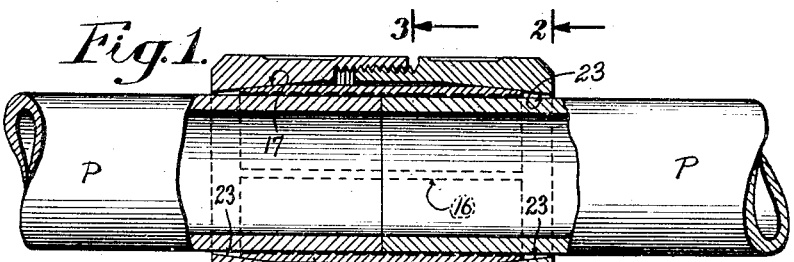
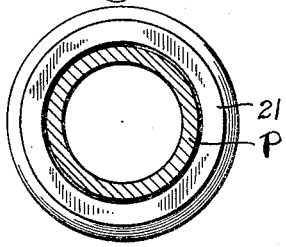
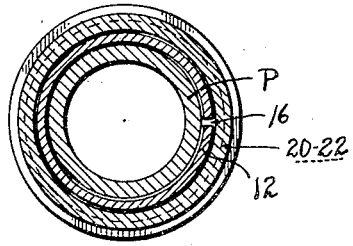
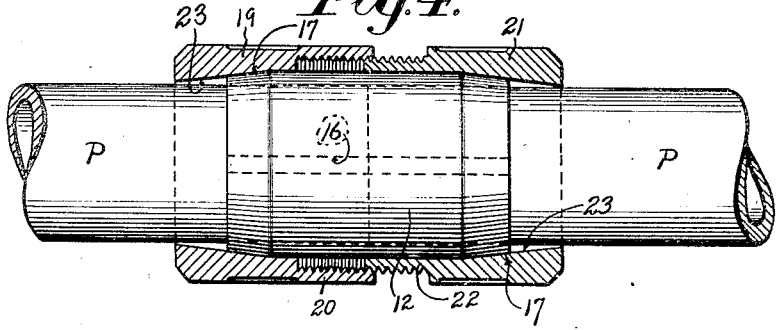
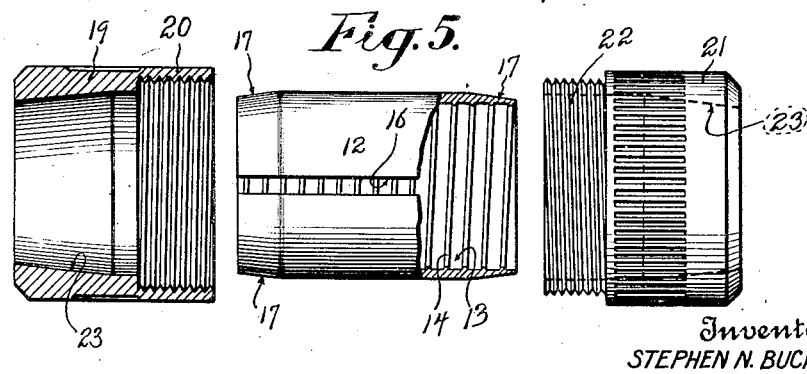
Inventor
STEPHEN N. BUCHANAN
By his Attorneys Feb. 2, 1932.                S. N. BUCHANAN                1,843,202
                               PIPE COUPLER
                          Filed Feb. 20, 1928          2 Sheets-Sheet 2
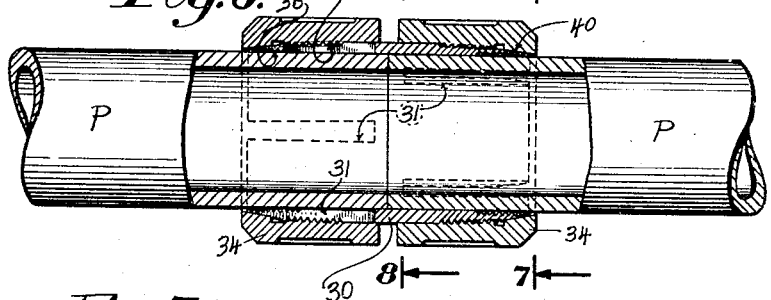
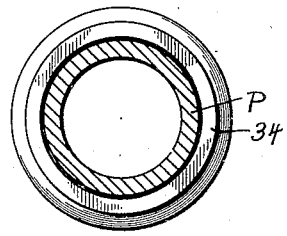   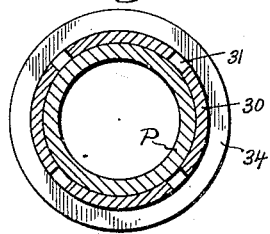
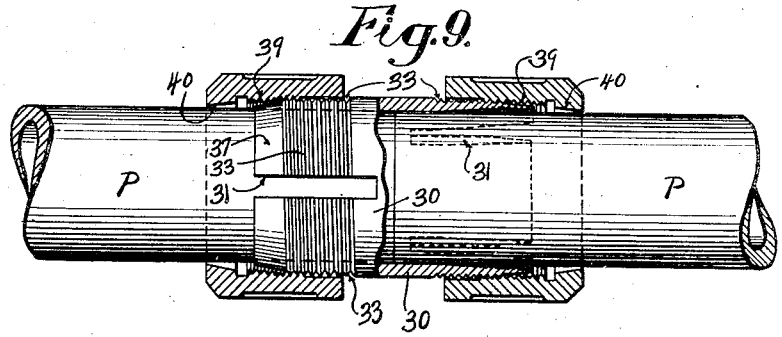
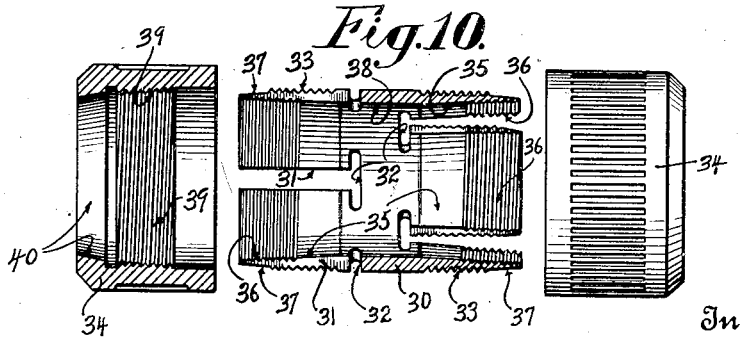
Inventor
STEPHEN N. BUCHANAN
By his Attorneys
Sohlber & Ledbetter Patented Feb. 2, 1932

1,843,202

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

PIPE COUPLER

Application filed February 20, 1928. Serial No. 255,522.

This invention relates to pipe couplers and more particularly to a threadless pipe coupler adapted to join together the smooth unthreaded adjacent ends of pipes or conduits.

An object of the invention is to produce a threadless pipe coupler so that conduits in electrical and other work may be joined without threading the pipes and to this end I provide a pipe coupler comprising operating means in the form of two cooperating coupler nuts, together with a pipe anchorage member in the form of a sleeve which contracts and squeezes with great force around the smooth ends of pipes placed in the coupler device by action of the operating means.

According to the principles of this invention, various changes in form and construction may be resorted to without departing from the scope of the invention and it is therefore an additional object to produce several forms of the pipe coupler. In one form of the device, the coupler nut operating means is interconnected by screwing the nuts together, while in another form the coupler nuts are screw fastened onto a pipe anchorage sleeve. In every case, the action of the coupler nuts is the same in that the pipe anchorage member or sleeve is clamped around the pipe with great force to connect two pipes.

In both forms wedging taper means is included in the device by which relative movement between the operating means and anchorage member effects a clamping and gripping movement of the anchorage member against a pipe or pipes received thereinto. Also split means is included in the anchorage member of all forms if such member is made in sleeve form to impart flexibility to the anchorage member.

The accompanying drawings show two examples of the invention, but several forms of construction are possible according to the principles involved.

Figures 1 through 5 show the first form of the invention wherein two coupler nut operating means screw one into the other to impart a clamping movement to an anchorage sleeve and hence to grip the latter against the pipes to be secured together. In this form, the pipe anchorage sleeve is not externally threaded to engage the nuts. The anchorage sleeve has a straight internal cylindrical surface which may if desired be grooved or ribbed to better break through the paint finish or scale on a pipe so as to establish a positive electrical ground connection.

Figure 1 illustrates the coupler in finally anchored position joining two pipes together, the coupler nuts, the anchorage sleeve, and the adjacent pipe ends being shown in longitudinal section.

Figure 2 shows a cross section on the line 2—2 of Figure 1; and Figure 3 shows a cross section on the line 3—3.

Figure 4 shows the pipe coupler mounted loosely on a pipe prior to being tightened up. The coupler nuts are in section while the anchorage sleeve and pipe are in elevation.

Figure 5 is a disassembled view of the pipe coupler, the parts thereof being in section and shown in spaced alinement ready to be assembled.

Figures 6 through 10 illustrate the second form of the invention wherein the anchorage sleeve is externally threaded to receive the coupler nuts, so that in this form of the invention the coupler nuts do not screw thread one into the other. The extremities of the anchorage sleeve on the inside thereof are tapered in form, the internal diameter increasing from the center outwardly. The inner cylindrical surface of the anchorage sleeve, like that in the first form, may also be ribbed, grooved threaded or corrugated, to better grip the pipe and make positive connection therewith.

Figure 6 shows the coupler of the second form in finally anchored position, the coupler parts and adjacent pipe ends being in longitudinal section.

Figure 7 shows a cross sectional view on the line 7—7 of Figure 6; and Figure 8 shows a cross sectional view on the line 8—8.

Figure 9 shows the coupler device placed in loose position on two pipe ends ready to be tightened up. The coupler nuts are in cross section while the connecting pipes are in elevation. The anchorage sleeve is in elevation at one end showing the tapered inner surface and its relation to the straight cylindrical surface of the pipe.

Figure 10 shows a view of the coupler removed from the pipe and disassembled with the parts disposed in spaced relation, the anchorage sleeve and one coupler nut being in section. This view shows a modified form of split means comprising a T-shaped slit which is sometimes employed.

The structure of both forms of the coupler have features in common. For example, an anchorage sleeve, including means rendering it flexible, is collapsed or contracted about the pipe by action of nuts screwing toward each other, and tapering means are included in all forms of construction to facilitate collapsing the sleeve around the pipe. The split means assumes different forms and the same is true of the tapering wedge means.

Referring further to the drawings for a more detailed description of the first form of the invention, it is to be noted that the purpose of the coupler is to join two pipes P without the necessity of threading the same. This facilitates general conduit installation. In this first form of the invention, there is shown an anchorage sleeve 12 which may, if desired, be smooth surfaced throughout but I have shown its internal cylindrical surface 13 made with ribs, corrugations, grooves or threads 14 so as to more positively grip the smooth pipe ends P. In certain cases, the threads or ribs 14 are an advantage in that they squeeze and cut through the paint or other finish or the scale on the pipe so as to establish a good electrical ground connection. These ribs or sleeve gripping portions 14 may be spiral and thus form a thread if desired or they may be made as separate corrugations or ribs.

The pipe anchorage member is made in the form of a sleeve 12 and is longitudinally split at 16 so that this sleeve may contract and expand about the pipe. Thus the sleeve includes expansible and contractible portions. When the sleeve 12 is free it expands to a size sufficient to receive thereinto the pipe ends P, and the clearance in the endwise slot 16 is sufficient to permit the anchorage sleeve to be collapsed and gripped around the pipe ends with powerful action. The ends of the sleeve 12 are externally tapered at 17 which is a smooth wedging means. This tapered or wedge-shaped sleeve-end portion 17 is adapted to be engaged by a coupler nut having an internal taper of similar shape and size as will be explained.

The cooperating coupler nuts are made for use in connection with the anchorage sleeve 12 and in this instance one coupler nut 19 is made with an internally screw threaded sleeve 20 at one end while another coupler nut 21 is made with an externally screw threaded sleeve 22. The threaded-nut sleeves 20 and 22 are interscrewed one into the other, thus causing the two nuts to move or approach each other and draw upon the sleeve 12. Each nut is formed with an inner tapered bore or opening 23 which is preferably tapered on the same angle and in the same direction as the taper 17 formed on each end of the anchorage sleeve 12. The two cooperating tapers 17 and 23 are similar and conform to each other and increase in size from the outer ends of the sleeve and nut respectively. In other words I call the smaller end of the nut bore 23 the outer end of the nut which means that the threaded sleeve ends 20 and 22 are the inner ends of the nuts.

As the two coupler nuts 19 and 21 are screw threaded one into the other, it follows that the tapered wedging opening 23 of each nut coacts with the tapered wedging ends 17 of the sleeve 12 with the result that the tapered surfaces 27 and 17 coact and wedge one against the other causing the sleeve 12 to collapse thereby reducing its diameter and tending to close the split 16. In this way, the sleeve 12 closes upon a pipe or pipes received therein with maximum gripping action thus cutting the pipe gripping threads or grooves 14 through the pipe finish or scale and making a positive electrical ground connection, and this is in addition to establishing a rigid physical connection between the two pipes P and anchorage sleeve 12.

It is seen that the sleeve 12 is acted on from both ends and the powerful action of the operating coupler nuts 19 and 21, in their movement along the sleeve and approach toward each other, imparts, through the taper means 17—23 of the device, a forceful sleeve closing operation which seats the anchorage member against the pipe.

There are shown several forms of sleeve split means to render the anchorage member expansible and contractible. For example in Figure 9 there are straight parallel splits 31 which cut each sleeve end into segmental portions, and in Figure 10 similar lengthwise splits 31 are employed in conjunction with circumferential splits 32 which form T-shaped slots or splits 31—32. On the other hand there is shown, in the first form of construction, one straight split 16 extending throughout the length of the sleeve 12. In all cases, the split means affords flexibility in the sleeve so it may dilate to receive a pipe and contract to seat thereagainst.

Coming now to a description of the second form of the invention as shown in Figures 6 through 10, an anchorage member 30 is also made in the form of a sleeve which is constructed somewhat differently from the anchorage sleeve 12 heretofore described, although of like principle. This sleeve 30 is provided with a plurality of splits which do not necessarily extend from end to end of the sleeve. Furthermore this sleeve 30 is externally threaded on a straight cylindrical surface to carry the coupler nuts so that the latter are not interthreaded one into the other as in the first form. Also cooperating tapered wedge means is provided by which this anchorage sleeve 30 effects positive surface engagement with the pipe placed therein.

The anchorage sleeve 30 is split from each end in a number of places, as indicated at 31. These splits 31 do not necessarily extend throughout the length of the sleeve but preferably stop short of reaching the center of the sleeve. In this way the two ends of the pipes P are introduced into the anchorage sleeve 30 and the adjacent pipe ends abut one against the other along a transverse line extending between the bottom or inner edges of the splits 31. In this way the pipes P cover the splits 31 from the inside of the sleeve 30.

The plurality of splits 31 form, in effect, segmental sleeve end portions in that the flexible or yieldable portions defined between the splits 30 are segmental as seen in Figure 8 and other views. In some cases, I stagger the splits 31 by arranging them at one end of the sleeve along a longitudinal line extending centrally between the splits 31 at the other end of the sleeve.

The outer surface of the anchorage sleeve 30 is screw threaded as shown at 33, and these threaded ends 33 are designed to cooperate with an internally threaded coupler nut 34 carried at each end of the sleeve. The sleeve 30 has its inner surface 35 threaded or smooth as the case may be, 35 pointing to the inner smooth surface portion. In the form shown, there are inside grooves or threads 36 provided to cut through the paint or scale on a pipe so as to make a good physical, as well as electrical, connection between the pipe and sleeve 30 in a manner similar to that heretofore described for the first form of construction.

The inner surface 35, whether threaded or smooth, is tapered to a limited degree. This taper is necessarily slight in degree and the diameter thereof decreases in size from each outer end toward the center of the sleeve 30. In other words, this tapered internal sleeve surface 35, whether smooth or threaded, is largest at the outer end of the sleeve and reduces slightly in size toward the center of the sleeve and extends toward the center but usually stops near the inner ends of the splits 31. A straight or untapered central cylindrical sleeve portion 38 is therefore formed in the anchorage sleeve between innermost ends of the tapers 35. This straight cylindrical portion 38 receives and holds the pipe in proper position while the nuts 34 or other operating means are being tightened up.

When a pipe P is inserted into the tapered sleeve opening 35 and portion 38 there exists a slight clearance between the external cylindrical pipe surface and the internal taper 35 of the anchorage sleeve. This clearance is greatest at the outer end of the sleeve and decreases toward the center region 38.

The external surface of each end of this sleeve 30 is tapered for a short distance as indicated at 37. This external taper 37 extends in the opposite direction from the internal taper 35. Furthermore, the external taper 37 may be shorter than the internal oppositely directed taper 35 of the sleeve. In the respects described, the sleeve 30 is therefore characteristically formed with two oppositely extending tapers 37 and 35 at each end, one taper 37 being external and short while the other taper 35 is internal and longer. Therefore I have laid out the wedge and taper means 35—37 on intersecting angles so as to direct them in opposite directions.

Each coupler nut 34 is internally threaded at 39 which adapts them to be screwed upon the threaded ends 33 of the sleeve 30. The threaded sleeve ends 33 are straight and cylindrical which is to say that the threads 33 are cut on a straight sleeve portion of the same radius from one end of the thread 33 to its other end. In other words, the external threads 33 of the sleeve are not tapered, although the inner smooth surface 35 is tapered and the latter may also be threaded, if desired, as shown at 36 for any portion of the taper 35 as desired. The threads 36 are used to cut through the scale or pipe finish to make positive anchorage with the pipe.

The internal threads 39 of each coupler nut 34 are cut on a tapered bore which decreases in size toward the outer ends of the nuts. Also each outer end of the nut 34 is made with a wedging taper 40. Therefore the tapered threads 39 and tapered smooth internal opening 40 are tapered in the same direction, namely toward the outer end of the nut. Furthermore the inner end of the tapered nut thread 39, that is the first and largest diameter thread thereof, is made the same size as the sleeve threads 33 so that the nut 34 can be easily started on the sleeve threads 33. The angle which the tapered threads 39 make with the axis of the nut 34 is less than the angle of the taper 40, the latter being a quick or steeper taper.

Having started the tapered nut threads 39 onto the straight sleeve threads 33, it follows that the outer end of the sleeve 30 begins to collapse or contract by reason of the split 31 as the nut 34 screws toward the center of the sleeve 30. Since the internal surface 35, smooth or threaded, of each end of the sleeve 30 is tapered, it follows that the collapsing action of the anchorage sleeve ends bring together the inner tapered sleeve surface 35 against the pipe, which gradually diminishes the tapering annular clearance existing between the pipe and the sleeve which clearance exists before the nuts 34 are run up. This arrangement provides full surface-area contact throughout the split region of the sleeve 30 which insures maximum gripping engagement between the sleeve and pipe, and a greater gripping area than would exist if I omitted the internal taper 35.

After the first one or two threads 39 of the nut are well started on the threads 33 of the sleeve, the remaining taper threads 39 turn easily on the sleeve threads 33 because the interengagement of the first threads distort the segmental portions toward the pipe which imparts a taper to the threads 33 which were formerly straight. The threads 33 now being tapered to conform to the threads 39, permits the nut to be screwed toward the center of the sleeve.

After the nuts 34 are screwed well upon the sleeve 30, the coacting wedge and tapering surfaces 37 and 40 become engaged with the result that a final collapsing or contracting action is effected between the split ends of the sleeve 30 and the pipe. However, the collapsing action of the tapered nut threads 39 against the sleeve threads 37 is alone effective to seat the inside sleeve surface 35—36 against the pipe, but an advantage exists in providing the sleeve nut tapering means 37—40 working in conjunction with the screw thread means 33—39 as will now be explained.

As the coupler nuts 34 and 39 are rotated relatively on the threads 33 and advance toward the center of the sleeve 30, it follows that the interengaged threads 33—39 may become tight and engage or coact with increasing pressure, especially toward the end of the travel of the nut. Thus the coupler nut turns harder as it approaches final position. However, when the nut has substantially approached its final position, the wedge and taper means 37—40 coact and cause additional contraction of the sleeve 30 with the important result that the pressure theretofore existing in the tight threads 33—39 is quickly and effectively relieved to a slight extent. The nut may now be again and further turned which is an advantage because it makes for unusual tightness in the final fit between all parts.

This second form of the invention by reason of its several cooperating taper means, affords unusually good frictional surface bearing contact between the inside surface 35—36 of the split ends of the sleeve 30 and the outside of the pipe. If it was not for the taper 35—36, then the split ends of the sleeve 30 would grip the pipe in fewer places, i. e. there would exist less contacting and engaging area between the pipe surface and inside surface of the anchorage sleeve, but as the structure here stands, the advance of the nut 34 along the sleeve threads 33 causes gradual contraction of the flexible segmental sleeve ends. By the time the nut reaches the end of its thread travel, the inner surface 35—36, threaded or smooth, attains full contact throughout with the pipe. A maximum bearing and seating contact is therefore attained between the anchorage member 30 and pipe which positively anchors the pipe or pipes in the coupler device.

I have therefore produced a coupler device which comprises in the main two parts, one a member which embraces a pipe or two adjacent pipe ends and the other an operating means to move in relation to the member. Threads formed on the device cause relative motion between the member and operating means, and wedging tapers formed on the device become effective by reason of the relative motion and cause a coaction which results in gripping one of the members against the pipe to anchor the pipe to the device. This coupler fills a use long felt, it comprises few parts, is simple to install, and is inexpensive to manufacture.

What is claimed is:

1. A pipe coupler comprising, an anchorage sleeve including split end portions, screw threads formed on the split end portions, a coupler nut mounted on each split end portion, said nuts formed with tapering threads which are cut on a taper that decreases in size toward the outer end of the nut, the tapering threads of the nut and the sleeve threads being screwed together to contract the split end portions of the sleeve; an external tapered extremity formed on the sleeve beyond the sleeve threads, at the end of the latter, and this extremity being tapered smaller at its outer end and increasing in size toward the sleeve threads; said nuts also including an internal tapering extremity formed at its outer end and conforming to the tapered extremity of the sleeve; and the sleeve and nut tapers being adapted to coact when the nuts are tightened to contract the sleeve, to release the pressure of the interengaged tapering nut threads and sleeve threads, whereby the nuts may be more easily turned when they begin to reach their final position on the sleeve.

2. A pipe coupler comprising, an anchorage sleeve including split means to form an expansible and contractible portion on the sleeve, straight threads formed on the sleeve, a coupler nut, threads formed in the nut on a surface which is tapered to reduce in size toward its outer end and adapted to screw onto the straight threads of the sleeve and to contract the expansible portion, cooperating tapering portions formed in the nut and at the end of the sleeve and adapted to engage when the nut is run up to final position whereby the pressure between the nut and sleeve threads is relieved by further contraction of the expansible portion to afford easier turning of the nut and hence it can be screwed further onto the sleeve.

3. A pipe coupler comprising, an anchorage sleeve to receive pipe and including split means to form an expansible and contractible portion on the end thereof, said sleeve end portion being internally tapered to reduce its diameter toward the center of the sleeve so that the sleeve end has the greatest inside diameter, external straight threads on the sleeve; and a nut having inside threads formed on a taper in opposite direction to the inner taper of the sleeve, whereby the tapered threads in the nut, when screwed onto the straight sleeve threads, cause the portion to contract and the inner tapered sleeve diameter to grip the pipe surface throughout the surface area of the inner sleeve taper.

4. A pipe coupler comprising, an anchorage sleeve to receive pipe and including split means to form an expansible and contractible portion on the end thereof, said sleeve and portion being internally tapered to reduce its diameter toward the center of the sleeve so that the sleeve end has the greatest inside diameter, external straight threads on the sleeve; and a nut having inside threads formed on a taper in opposite direction to the inner taper of the sleeve, whereby the tapered threads in the nut, when screwed onto the straight sleeve threads, cause the portion to contract and the inner tapered sleeve diameter to grip the pipe surface throughout the surface area of the inner sleeve taper; an external smooth taper on the extremity of the sleeve beyond the straight threads, an internal smooth taper in the nut beyond the tapered threads thereof, the two smooth tapers named being adapted to coact and wedge together after the nut is screwed well onto the sleeve, whereby the wedging action of the two smooth tapers effects further contraction of the expansible portion to relieve the tightness in the interengaged sleeve and nut threads so the nut can be more easily screwed up to the limit on the sleeve.

5. A coupler comprising, an anchorage sleeve including a split to render it flexible, said sleeve having an internal long taper reaching from its end back into the sleeve and decreasing in diameter from said end, said sleeve having an external smooth short taper formed at its end, straight threads on the sleeve back of the smooth short taper; the smooth external sleeve taper being shorter than the internal taper of the sleeve, and these two tapers formed on intersecting angles; an operating nut having inside tapered threads decreasing in diameter toward its outer end and adapted to screw onto the straight threads of the sleeve, and said nut having an internal smooth taper at its outer end decreasing in diameter toward said outer end thus conforming to the smooth external sleeve taper and coacting therewith when the nut is screwed into final position.

In testimony whereof I affix my signature.

STEPHEN N. BUCHANAN.